United States Patent [19]

Hems et al.

[11] Patent Number: 4,457,663

[45] Date of Patent: Jul. 3, 1984

[54] VEHICLE ENTRY SYSTEM FOR INVALIDS AND A WHEEL CHAIR SUITABLE FOR USE WITH THE ENTRY SYSTEM

[75] Inventors: Colin E. Hems, Northfield; Ian S. Copsey, Fair Oak, both of England

[73] Assignee: Gowrings Ltd., Reading, England

[21] Appl. No.: 245,048

[22] Filed: Mar. 18, 1981

[30] Foreign Application Priority Data

Mar. 19, 1980 [GB] United Kingdom ................ 8009301

Jun. 20, 1980 [GB] United Kingdom ................ 8020324

[51] Int. Cl.³ ............................ B60P 3/00; B60P 1/64

[52] U.S. Cl. ............................ 414/522; 280/289 WC; 297/DIG. 4; 414/539; 414/786; 414/921

[58] Field of Search ............... 414/522, 921, 462, 467, 414/498, 539, 786; 280/289 WC; 297/DIG. 4

[56] References Cited

U.S. PATENT DOCUMENTS

| | | | |
|---|---|---|---|
| 2,454,566 | 11/1948 | Pfeiffer | 414/522 |
| 3,882,949 | 5/1975 | Anderson | 297/DIG. 4 |
| 3,905,436 | 9/1975 | Karchak, Jr. et al. | 297/DIG. 4 X |
| 4,142,641 | 3/1979 | Dake | 414/921 X |
| 4,170,368 | 10/1979 | Southward et al. | 414/921 X |
| 4,278,387 | 7/1981 | Seguela et al. | 414/921 X |

FOREIGN PATENT DOCUMENTS

| | | |
|---|---|---|
| 79401 | 1/1978 | Australia . |
| 7117676 | 6/1973 | Netherlands . |
| 2026398A | 4/1929 | United Kingdom . |
| 2048791A | 3/1930 | United Kingdom . |
| 2000086A | 6/1973 | United Kingdom . |
| 2009097A | 5/1975 | United Kingdom . |
| 1420834 | 1/1978 | United Kingdom . |

OTHER PUBLICATIONS

European Patent Office Search Report on application No. EP 81-30-1028.

*Primary Examiner*—Robert B. Reeves

*Assistant Examiner*—David F. Hubbuch

*Attorney, Agent, or Firm*—Saidman, Sterne & Kessler

[57] ABSTRACT

A vehicle entry system for invalids includes a wheelchair and a wheelchair mounting device. The wheelchair mounting device includes a platform that is swivellably and non-tiltably mounted in a motor vehicle. The wheelchair is moved forwardly to straddle the platform when the platform is extended out from a vehicle opening. The wheelchair's wheels are then movable in at least a vertical direction, relative to the wheelchair's seat, to a level above the sill of the vehicle opening to clear same as the platform is swivelled into the vehicle.

18 Claims, 5 Drawing Figures

VEHICLE ENTRY SYSTEM FOR INVALIDS AND A WHEEL CHAIR SUITABLE FOR USE WITH THE ENTRY SYSTEM

BACKGROUND OF THE INVENTION

This invention relates to a vehicle entry system for invalids, particularly but not exclusively to an entry system whereby an occupant of a wheel chair may enter and leave a motor vehicle without however the need to dismount from the wheel chair, and to a wheel chair suitable for use with the entry system.

The problem of motor transport for invalids who need to use wheel chairs has been solved in a number of ways. One solution is a specially designed motor vehicle with a suitable seat and hand controls for the person's use, but in this case it is necessary to leave the wheel chair. For many people, leaving the wheel chair is a very difficult manuever and may require assistance either from one or more other persons or with the aid of mechanical lifts or other apparatus. The transfer to and from the vehicle is difficult and often extremely painful.

A further solution has therefore been proposed namely to adapt the vehicle so that the occupant of the wheel chair may enter and leave the vehicle without the necessity for leaving the wheel chair. Specially adapted vehicles which have been designed for this purpose in the past have the disadvantage that the special adaptation involves major and irreversible alteration of the structure of the standard vehicle. When the vehicle is resold, after its use by a wheel chair occupant is over, the special adaptations may render it unsuitable for use by anyone else and its second-hand value is therefore extremely low.

SUMMARY OF THE INVENTION

In a first aspect, the invention provides a vehicle entry system for invalids, comprising a platform, means for swivellably and non-tiltably mounting the platform in a motor vehicle for movement, in use, between a first loading or unloading position in which the platform projects outwardly through an adjacent door opening in the vehicle and a second position which is angularly displaced from the first position and in which the platform is housed entirely within the vehicle, and means for releasably retaining the platform in its second position.

In a second aspect, the invention provides a motor vehicle fitted with the vehicle entry system according to the first aspect of the invention and provided with a steering wheel behind which the entry system is positioned, the steering wheel having a releasable locking mechanism whereby it can be moved to facilitate entry of an invalid into the vehicle.

In a third aspect, the invention provides a wheel chair suitable for use with the entry system according to the first aspect of the invention, comprising a seat, a set of ground engageable wheels, and means for adjusting the set of wheels relative to the seat at least in a vertical direction, the wheel chair being capable of straddling the platform with said wheels in engagement with the ground on opposite sides of the platform and the wheels being movable in said at least vertical direction to a level above the sill of the door opening when the seat is mounted on the platform.

In a fourth aspect, the invention provides a method of mounting the wheel chair according to the second aspect of the invention in a motor vehicle equipped with the entry system according to the first aspect of the invention, comprising the steps of:

(a) swivelling the platform to its first position;

(b) propelling the wheel chair so that its seat adopts a position over the platform;

(c) operating the means for adjusting the set of wheels relative to the seat to raise the set of wheels relative to the platform; and (d) swivelling the platform to its second position.

It is thus possible to provide apparatus for mounting a wheel chair in a motor vehicle with minimum adaptation of the standard vehicle and also enabling entry and leaving of the motor vehicle by an occupant of a wheel chair to be carried out easily and generally without any assistance.

BRIEF DESCRIPTION OF THE DRAWING

The invention will now be more particularly described, by way of example, with reference to the accompanying drawings, wherein.

DETAILED DESCRIPTION OF THE PREFERRED EMBODIMENTS

Figure 1:
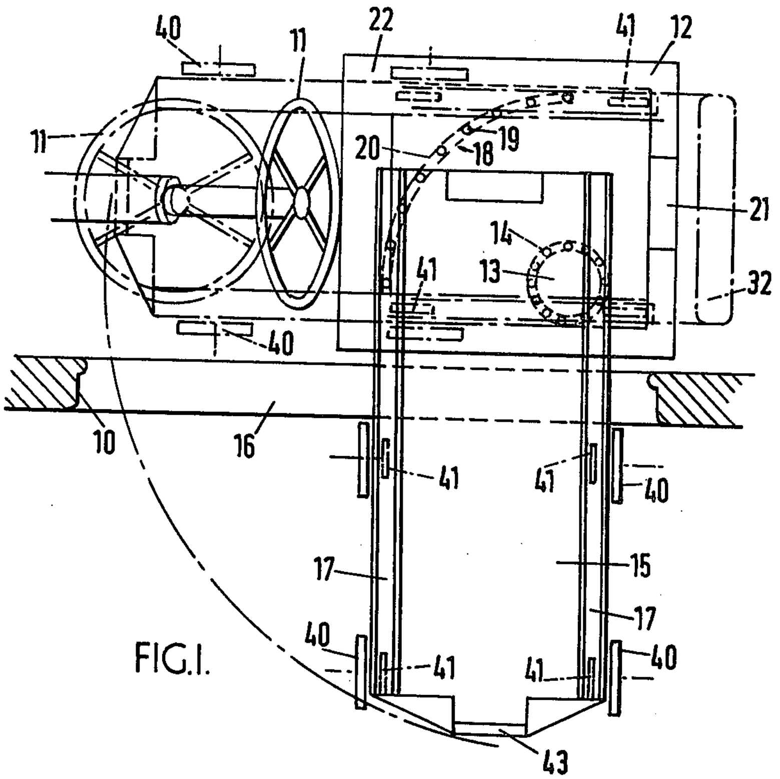
FIG. 1 is a plan view of one embodiment of an entry system according to the first aspect of the invention, assembled in a motor vehicle.

Referring to FIG. 1, the entry system shown therein is fitted in a motor vehicle in place of the normal driving seat, although it could be fitted in the vehicle in place of the normal passenger seat. Ideally, the motor vehicle is a 2-door vehicle since it will possess a wider door opening. The motor vehicle shown is a left hand drive vehicle and has a door opening 10 and a steering wheel 11.

The apparatus comprises a support 12 securely bolted to the floor within the vehicle. The support is generally rectangular and a turntable 13 is journalled in the support 12 by two axially spaced ball-bearings, only the upper one of which is shown at 14. The turn-table is disposed adjacent to the rear corner of the support adjacent the door opening. A platform 15 is secured to the upper end surface of the turntable 13. As a result the platform can swing between a first wheel chair loading or unloading position (shown in full lines) in which the platform 15 projects outwardly through the door opening 10 and well beyond a door sill 16 of the vehicle and a second position (shown in broken lines in FIG. 1) which is angularly displaced from the first position by 90° and in which the platform 15 is housed entirely within the vehicle.

The swivel axis of the platform 15 is disposed towards the rear end of the platform and is offset from a central longitudinally extending line towards the door opening 10. This arrangement allows a portion of the platform rearwardly of the swivel axis to swivel into a position within the vehicle such that it extends rearwardly of the rear post of the door opening 10. This maximizes the permissible length of the platform and it is believed that this will in most cases avoid any need to provide an extendible platform.

The platform 15 has a guide track 17 along each longitudinal side thereof for a purpose which becomes apparent hereinafter.

The support 12 has an arcuate bearing assembly 18 centered about the swivel axis of the platform and having a radius slightly less than the distance between the swivel axis and the longitudinal side edge of the platform remote from the door opening when the platform is disposed in its second position. The bearing assembly 18 comprises a plurality of balls 19 mounted in spaced relationship on a nylon seat 20. The bearing assembly serves to support the platform relative to the support 12 during swivelling movement thereof.

The platform 15 and support 12 are provided with a self locking mechanism 21 which automatically locks when the platform is located in its second position entirely within the vehicle and which may be released by a solenoid operated mechanism operated by a switch (not shown) located at an easily accessible position. It is also advantageous to provide an additional positively and manually operable locking mechanism 22. The mechanism 22 should be in easy reach of an occupant of the wheel chair when the latter is supported on the platform and at least one of the mechanisms 21 and 22 should, preferably, include a sensor operable to interrupt the vehicle ignition circuit until said at least one mechanism is engaged. A suitable warning device, such as a warning light, could also be provided.

It will be apparent from the foregoing that the platform will not tilt about a horizontal axis and consequently, when it projects outwardly through the door opening 10 it extends in a plane parallel or substantially parallel to the ground surface on which the vehicle is parked and is spaced from said ground surface.

Figure 2:
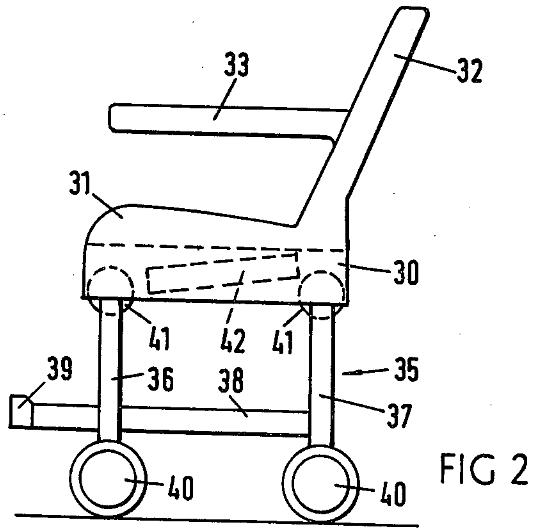
FIG. 2 is a schematic view of one embodiment of a wheel chair according to the third aspect of the invention and suitable for use with the entry system shown in FIG. 1.

FIG. 2 illustrates a wheel chair suitable for use with the above entry system. The wheel chair comprises an undercarriage 30 carrying a seat portion 31, and a back rest portion 32 which may be pivotable relative to the seat portion 31. Two arm rests 33 are also provided and, if desired, a head-rest or head restraint (not shown) may also be provided. A parallelogram linkage, generally indicated by reference numeral 35, is connected to each of two opposite sides of the undercarriage 30. Each linkage 35 comprises a pair of parallel links 36 and 37 pivotably connected at upper ends to front and rear ends respectively of the undercarriage and interconnected adjacent lower ends by a link 38 pivotably connected at opposite ends to the links 36 and 37 respectively. The links 38 are extended forwardly of links 36 and are interconnected at their forward ends by a cross-member which carries a foot rest 39.

A ground engageable wheel 40 is journalled to the lower end of each link 36, 37 and the under carriage supports platform engageable means in the form of four wheels or rollers 41 journalled to the undercarriage adjacent each corner thereof and disposed inboard of the wheels 40.

Fluid pressure actuated means in the form of one or more hydraulic piston and cylinder units operable by a hand pump (not shown) are indicated schematically by the general reference numeral 42. The fluid pressure actuated means can be operated by the hand pump to move the parallelogram linkages 35 such that the ground engageable wheels and foot rest 39 are moved relative to the undercarriage with simultaneous vertical and forward horizontal components of movement.

In order to mount the wheel chair in the motor vehicle the platform is initially swung to its first wheel chair loading position. The wheel chair shown in FIG. 2 is then propelled manually or by power operated means which may be provided but which are not shown, rearwardly so that the seat portion 31, platform engageable wheels or rollers 41 and undercarriage 30 adopt a position over the platform with the two pairs of ground engageable wheels engaging the ground on opposite sides of the platform 15. The undercarriage has releasable self operating latch means (not shown) engageable with a detent member 43 on the front edge of the platform 15 to prevent unintentional movement of the wheel chair forwardly away from its position over the platform. The fluid pressure actuated means on the wheel chair are then operated by the hand pump to lower the platform engageable wheels or rollers 41 onto respective guide tracks 17 and then to raise the ground engageable wheels 40 and foot rest 39 with a forward horizontal component of movement to a level at which the lower edges of the wheels are at least above the upper edge of the door sill 16 and the foot rest 39 is above the platform 15. The wheel chair is then moved rearwardly along the platform on its platform engageable wheels or rollers 41 until the forward end of the wheel chair—the foot rest 39—does not project forwardly of the front edge of the platform 15.

The platform 15 is then swivelled manually, although power operated means could be provided for this purpose, to its second position in which it is securely locked. The wheel chair is then located and secured on the platform 15 and preferably means are provided on the platform for doing this in any one of a plurality of positions so that the occupant of the wheel chair can readily reach the vehicle controls.

When the occupant of the wheel chair wishes to disembark from the car, reverse procedures are followed. It is thus possible with this apparatus for an occupant of the wheel chair to enter or leave a motor vehicle while remaining in the wheel chair and without any outside assistance.

Preferably, hand controls are fitted for operation of the vehicle in a known manner and preferably in order to facilitate wheel chair entry to and disembarkation from the car while an occupant is seated thereon, the steering wheel is so arranged that it can be hinged upwardly or otherwise moved. A releasable mechanism is provided for this purpose. When the wheel chair and platform are in a normal vehicle driving position the steering wheel can be brought into its normal position and locked.

The steering wheel assembly may be of such a length that the wheel is positioned slightly higher and to the rear in relation to a standard steering wheel supplied with the car. This will provide more leg room for the driver and also bring the wheel nearer to the driver's body.

When the car is to be sold after use by the invalid, it is possible to remove the entire apparatus from the vehicle and to substitute the original driving seat whereupon the car is substantially in standard form.

If necessary, the platform may have a telescopically retractable extension and in particular this may be necessary if the apparatus is mounted in a four door car with a door opening of relatively small width.

Figure 3:
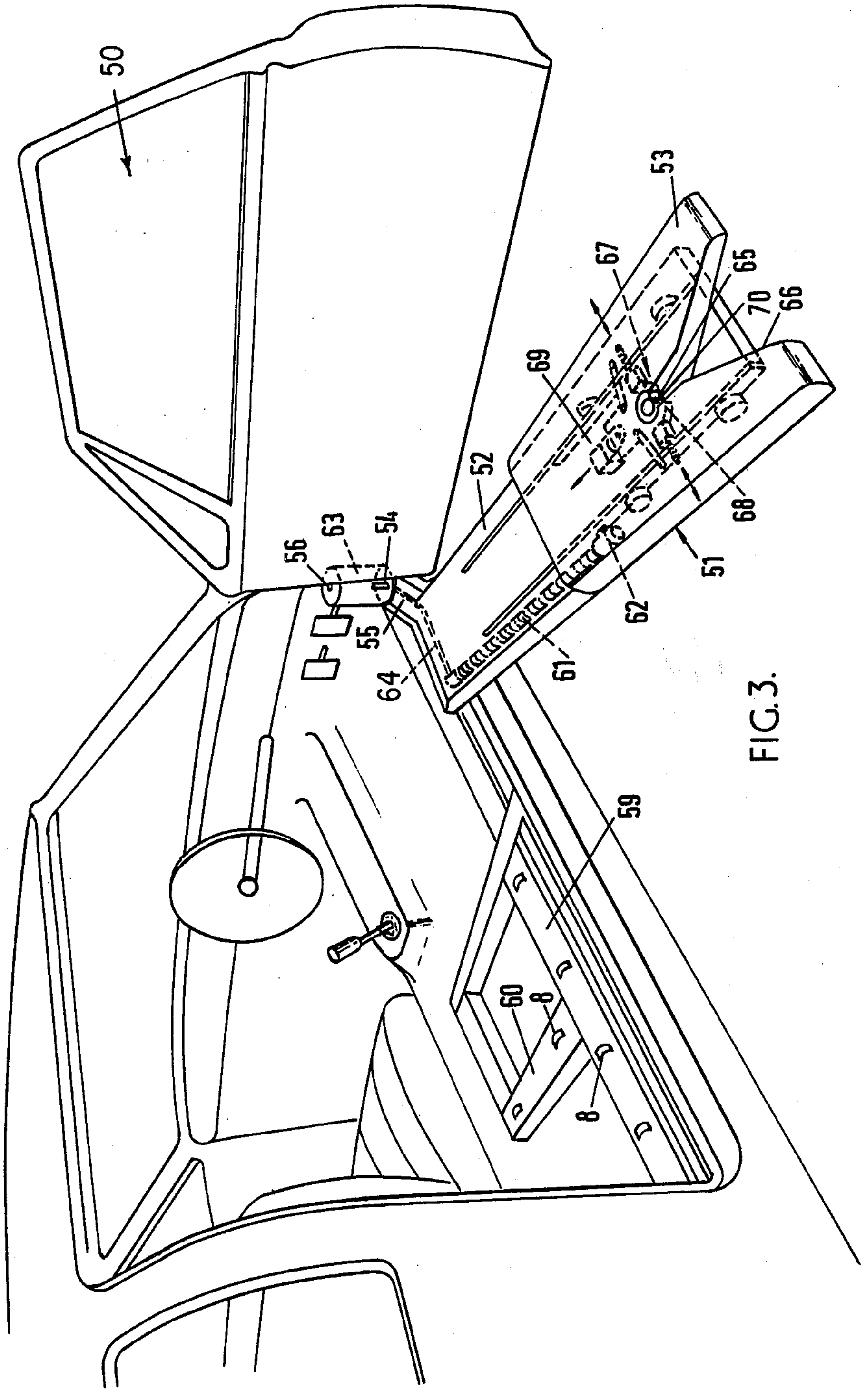
FIG. 3 is a perspective view of another embodiment of an entry system according to the first aspect of the invention, assembled in a motor vehicle.

Referring to FIG. 3, the entry system shown therein is fitted in a right hand drive motor vehicle in place of the normal driving seat. The vehicle has a door opening 50.

The entry system includes a platform 51 which comprises a generally rectangular beam 52 and a carriage 53 slidably mounted on the beam. The beam 52 is connected to a swivel joint 54 by an arm 55. The axis 56 of the swivel joint is vertical and is spaced outwardly from that side of the platform adjacent the door opening 50. Moreover, the axis 56 is located inside the vehicle and just forward of the front post of the door opening 50. Hence, the axis 56 is adjacent the forward end of the platform 51.

The platform 51 can swing between a first loading or unloading position in which it projects outwardly through the door opening 50 and well beyond a door sill of the vehicle, at an angle of about 70° to the longitudinal extent of the vehicle, and a second position which is angularly displaced from the first position by about 70° and in which the platform 51 is housed entirely within the vehicle. A longitudinally extending bearing assembly 59 and a transversely extending bearing assembly 60 located about midway between the door posts of the door opening 50 assist in supporting the platform 51, although when the platform is in its second position the platform is inwardly offset from the bearing assembly 59 and in this position the platform may be further supported at its rear end on low friction pads (not shown). The bearing assemblies 59 and 60 each comprise a plurality of spaced independently swivellable castors 8.

The platform can be swung easily by an invalid and generally a power operated mechanism will not be required. However, it is conceivable that this movement may be linked to opening and closing of the adjacent vehicle door. The platform 51 is locked in its second position in a manner similar to that described in the embodiment of FIG. 1.

It will be apparent from the foregoing that the platform 51 will not tilt about a horizontal axis and consequently, when it projects outwardly through the door opening 10 it extends in a plane parallel or substantially parallel to the ground surface on which the vehicle is parked and is spaced from said ground surface.

A worm and nut assembly 61 and 62 respectively is provided to slidably move the carriage 53 along the beam 52. The worm 61 is driven by a motor 63 mounted on the arm 55 via a flexible drive 64. However, it is conceivable that the carriage could be moved manually. With the motor driven worm and nut assembly, when the motor is de-energised, the carriage will be positively held against movement relative to the beam particularly if a reduction gear box is incorporated in the assembly.

The carriage 53, as shown, has a king pin coupling including an aperture 65 for receiving a king pin attached to a wheel chair as hereinafter described. The aperture 65 communicates with the rear edge of the carriage by way of an opening 66 and has a self-locking mechanism 67 associated therewith. The self-locking mechanism comprises two jaws 68 spring biased towards a closed position. A solenoid operated release mechanism 69 is provided to open the jaws 68 in order to permit disengagement of the king pin from the aperture 65. The jaws 68 have cam surfaces 70 so that the king pin will force the jaws apart to permit the king pin to engage with the king pin coupling on the carriage as the wheel chair is mounted on the carriage. A mechanically operated quick action override release mechanism (not shown) may also be provided in the event that the car is involved in an accident.

Figure 4:
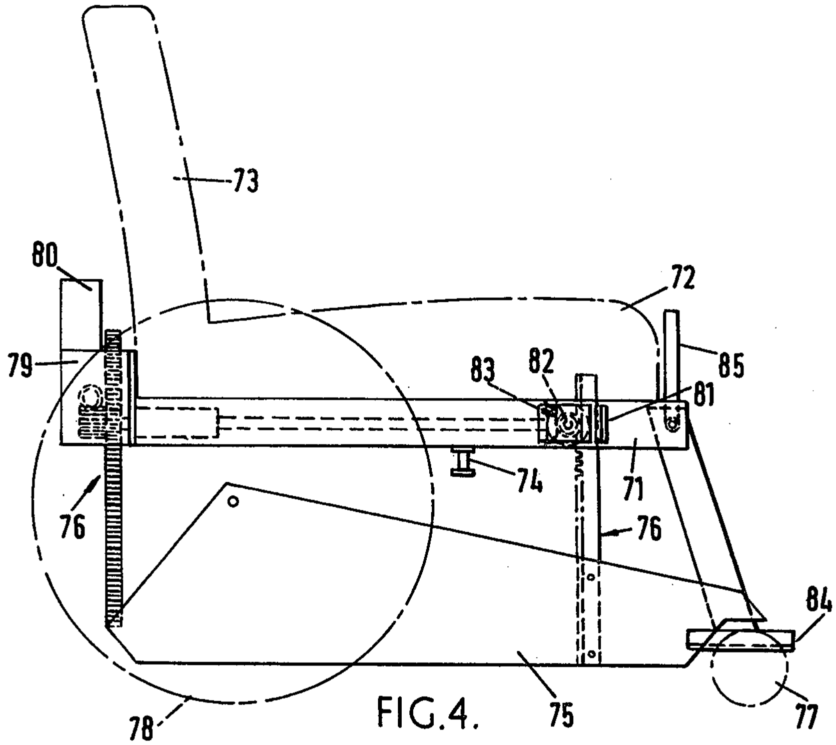
FIG. 4 is a side view of a further embodiment of a wheel chair according to the third aspect of the invention and suitable for use with the entry system shown in FIG. 4.
Figure 5:
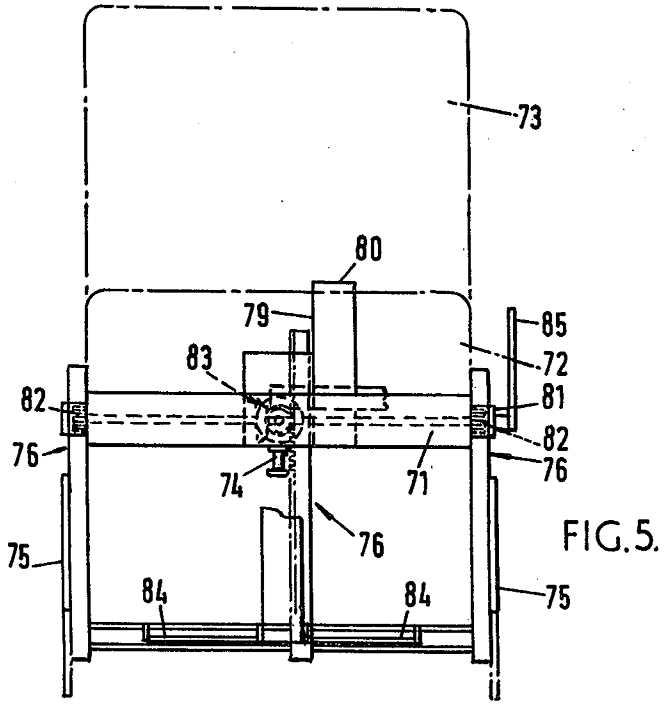
FIG. 5 is a front end view of the wheel chair shown in FIG. 4.

FIGS. 4 and 5 illustrate a wheel chair suitable for use with the entry system of FIG. 3. A base 71 carries a seat portion 72 and a back rest 73 which is pivotable relative to the seat portion. The aforesaid king pin, indicated at 74, is secured to the lower surface of the base 71. The base 71 is connected to a wheel support unit 75 by three rack and pinion devices 76. The unit 75 is U-shaped in plan and is open at the front end of the wheel chair. The unit 75 supports two small diameter front wheels 77 and two large diameter rear wheels 78. The racks of the rack and pinion devices are secured to the unit 75 and are upstanding therefrom. The rear rack passes through a casing 79 and is engaged by a pinion driven by a motor 80. The two side racks extend through respective brackets 81 mounted on opposite sides of the base 71 and are driven by pinions 82 in turn driven by the first mentioned pinion via a 1:1 bevel drive 83. The wheel chair also has two footrests 84 which can be raised by manual operation of a lever 85 just prior to mounting the wheel chair on the carriage 53.

In order to mount the wheel chair in the motor vehicle, the platform 51 is initially swung to its first loading position. Each footrest of the wheel chair is moved forwards and upwards before the wheel chair is propelled in a forwards direction over the carriage 53, with the wheels engaging the ground on opposite sides of the carriage, until the coupling engages the king pin. The wheels of the wheel chair are then raised above the level of the upper edge of the door sill and the platform 51 is swung to its second position in which it is securely locked. The position of the wheel chair can then be adjusted by moving the carriage 53 relative to the beam 52 in a fore and aft direction.

When the occupant of the wheel chair wishes to disembark from the car, reverse procedures are followed.

The advantage of this entry system over that shown in FIG. 1 is that by arranging for the occupant to approach the platform in a forwards as opposed to a rearwards direction, the entry to the vehicle is made easier, and the occupant can adopt a more extended and hence more comfortable position during the entry operation.

The vehicle may be fitted with hand controls and with a steering wheel/column of the type mentioned previously.

Instead of receiving a wheel chair, the carriage 53 may be provided with a permanent and pivotable seat which can be mounted by an invalid without too much difficulty when the platform is in its first loading position. Instead of pivotably mounting the seat on the carriage, the carriage could be pivotable relative to the beam.

The term platform as used herein is intended to cover any suitable support means which when mounted in the vehicle has a width and a length both of which are substantially greater than its depth.

We claim:

1. A vehicle entry system for use by invalids in entering a motor vehicle through a door opening, comprising:

a platform;

means for swivellably and non-tiltably mounting the platform in the motor vehicle for movement about a swivel axis which is located adjacent the forward end of the platform and between a first loading or unloading position in which the platform projects outwardly through the door opening in the vehicle and a second position which is angularly displaced from the first position and in which the platform is housed entirely within the vehicle, the seivel axis being offset from a central longitudinally extending line towards that side thereof which, in use, in the second position of the platform, lies adjacent to the door opening; and means for releasably retaining the platform in the second position.

2. The entry system of claim 1, wherein the platform is provided with means for locating a wheel chair thereon.

3. The entry system of claim 1, wherein a seat is mounted on the platform.

4. A system for invalids to use in entering a motor vehicle, comprising:

a platform, a seat pivotably mounted on the platform, means for swivellably and non-tiltably mounting the platform in the motor vehicle for movement about an axis, between a first loading or unloading position in which the platform projects outwardly through the door opening in the vehicle and a second position in which the platform is angularly displaced from the first position and in which the platform is housed entirely within the vehicle, and means for releasably retaining the platform in the second position.

5. A system for invalids to use in entering a motor vehicle through a door opening having a sill, comprising a wheelchair and a wheelchair mounting device; said wheelchair mounting device including: a platform having a forward end, means for swivellably and non-tiltably mounting said platform in the motor vehicle for movement, between a first loading or unloading position in which said platform projects outwardly through the door opening in the vehicle and a second position which is angularly displaced from said first position and in which said platform is housed entirely within the vehicle, about an axis adjacent said forward end of said platform and offset from a central longitudinally extending line on one side thereof which, in use, in said second position of said platform lies adjacent to the door opening, means for locating said wheelchair on said platform and means for releasably retaining said platform in said second position; said wheelchair including: a seat, a set of ground engageable wheels, and means for adjusting said set of wheels relative to said seat at least in a vertical direction, said wheelchair being capable of straddling said platform with said wheels in engagement with the ground on opposite sides of said platform, said wheels being movable in said at least vertical direction to a level above the sill of the door opening when said seat is mounted on said platform.

6. The entry system of claim 5, wherein the swivel axis is spaced outwardly from said one side of the platform.

7. The entry system of claim 5, wherein the platform mounting means includes bearing means for supporting the platform, during angular movement, at a position removed from the swivel axis.

8. The entry system of claim 5, wherein the platform comprises a beam and a carriage slidably mounted on the beam.

9. The entry system of claim 8, wherein power operated means are provided to move the carriage along the beam.

10. The entry system of claim 5, wherein the platform retaining means comprises means engageable automatically when the platform assumes its second position.

11. The entry system of claim 10, wherein the platform retaining means also comprises manually operable means.

12. The entry system of claim 5, wherein the platform retaining means includes a sensor operable to interrupt the vehicle ignition when the retaining means is disengaged.

13. The system of claim 5, wherein said wheelchair further comprises means for co-operating with wheel chair locating means of said mounting device to selectively prevent movement of the wheel chair relative to the platform.

14. The system of claim 13, wherein said wheelchair further comprises one or more footrests and means for moving each footrest relative to the seat with simultaneous vertical and horizontal components of movement.

15. The system of claim 5, wherein said wheelchair further comprises fluid pressure operated means for adjusting the set of wheels relative to the seat.

16. The system of claim 5, wherein said wheelchair further comprises electrically operated means for adjusting the set of wheels relative to the seat.

17. The system of claim 5, wherein said platform is extendable.

18. A method of mounting a wheel chair in a motor vehicle having a door opening having a sill and equipped with a wheelchair mounting device, the wheelchair mounting device including a platform having a forward end, means for swivellably and nontiltably mounting the platform in the motor vehicle for movement, between a first loading or unloading position in which the platform projects outwardly through the door opening in the vehicle and a second position which is angularly displaced from the first position and in which the platform is housed entirely within the vehicle, about an axis adjacent the forward end of the platform and offset from a central longitudinally extending line on one side thereof which, in use, in the second position of the platform lies adjacent to the door opening; and the wheelchair including a seat, a set of ground engageable wheels, and means for adjusting the set of wheels relative to the seat at least in a vertical direction, the wheelchair being capable of straddling the platform with the wheels in engagement with the ground on opposite side of the platform, the wheels being movable in the at least vertical direction to a level above the sill of the door opening when the set of wheels is mounted on the platform, comprising the steps of:

(a) swivelling the platform to its first position;

(b) propelling the wheelchair so that its seat adopts a position over the platform;

(c) operating the means for adjusting the set of wheels relative to the seat to raise the set of wheels relative to the platform; and (d) swivelling the platform to its second position.

* * * * *